United States Patent
Harris

(10) Patent No.: US 10,760,249 B2
(45) Date of Patent: Sep. 1, 2020

(54) FAUCET KNOB RETURN SPRING KIT

(71) Applicant: Obie Harris, Ridgeway, VA (US)

(72) Inventor: Obie Harris, Ridgeway, VA (US)

(*) Notice: Subject to any disclaimer, the term of this patent is extended or adjusted under 35 U.S.C. 154(b) by 149 days.

(21) Appl. No.: 16/162,653

(22) Filed: Oct. 17, 2018

(65) Prior Publication Data

US 2020/0123743 A1   Apr. 23, 2020

(51) Int. Cl.
*E03C 1/04* (2006.01)
*F16K 31/60* (2006.01)
*F16K 31/56* (2006.01)

(52) U.S. Cl.
CPC .......... *E03C 1/0412* (2013.01); *F16K 31/602* (2013.01); *F16K 31/563* (2013.01)

(58) Field of Classification Search
CPC ........ F16K 31/602; F16K 31/60; F16K 31/56; F16K 31/563; F16K 31/566; E03C 1/0412; E03C 1/042; Y10T 137/7069; Y10T 137/7256; Y10T 137/7062
USPC .......................... 251/227; 137/383, 385, 382
See application file for complete search history.

(56) References Cited

U.S. PATENT DOCUMENTS

| | | | | |
|---|---|---|---|---|
| 1,068,773 A | * | 7/1913 | Hurdman | F16K 35/06 137/383 |
| 1,291,987 A | * | 1/1919 | Mapel | F16K 31/56 251/68 |
| 2,866,343 A | * | 12/1958 | Kovacs | F01L 1/00 74/54 |
| 3,765,455 A | | 10/1973 | Countryman | |
| 4,457,452 A | | 7/1984 | Symmons | |
| 5,927,328 A | | 7/1999 | Nelson | |
| 6,772,453 B2 | * | 8/2004 | Fine | E03C 1/041 137/382 |
| 7,108,011 B1 | | 9/2006 | Lordahl | |
| D570,449 S | | 6/2008 | Lee | |
| 7,537,025 B2 | | 5/2009 | Kuna | |
| 9,541,217 B1 | | 1/2017 | Javaruski | |

* cited by examiner

*Primary Examiner* — Kelsey E Cary

(57) ABSTRACT

A faucet knob return spring kit for automatic shut off includes a pair of knob sleeves each having an outer perimeter and a through hole. The through hole is configured to receive and secure a faucet knob. A pair of sleeve eyelets is coupled to the outer perimeter of the pair of knob sleeves. Each of a pair of extension springs has a sleeve hook end coupled to the pair of sleeve eyelets and a wall hook end. Each of the pair of extension springs has a rest position and an alternate stretched position. Each of a pair of eyelet screws has a spring eyelet and a threaded screw. The spring eyelet is coupled to the wall hook end of the pair of extension springs and the threaded screw is configured to mount into a wall adjacent the faucet knob.

5 Claims, 4 Drawing Sheets

FAUCET KNOB RETURN SPRING KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to faucet knob attachments and more particularly pertains to a new faucet knob attachment for automatic shut off.

BRIEF SUMMARY OF THE INVENTION

An embodiment of the disclosure meets the needs presented above by generally comprising a pair of knob sleeves with each of the pair of knob sleeves having an outer perimeter and a through hole. The through hole is configured to receive and secure a faucet knob. A pair of sleeve eyelets is coupled to the outer perimeter of the pair of knob sleeves. A pair of extension springs is coupled to the pair of sleeve eyelets. Each of the pair of extension springs has a sleeve hook end and a wall hook end. The sleeve hook end is coupled to the pair of sleeve eyelets. Each of the pair of extension springs has a rest position and an alternate stretched position. A pair of eyelet screws is coupled to the pair of extension springs. Each of the pair of eyelet screws has a spring eyelet and a threaded screw. The spring eyelet is coupled to the wall hook end of the pair of extension springs and the threaded screw is configured to mount into a wall adjacent the faucet knob.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those kit forth above will become apparent when consideration is given to the following detailed description thereof. Such description makes reference to the annexed drawings wherein.

DETAILED DESCRIPTION OF THE INVENTION

Figure 1:
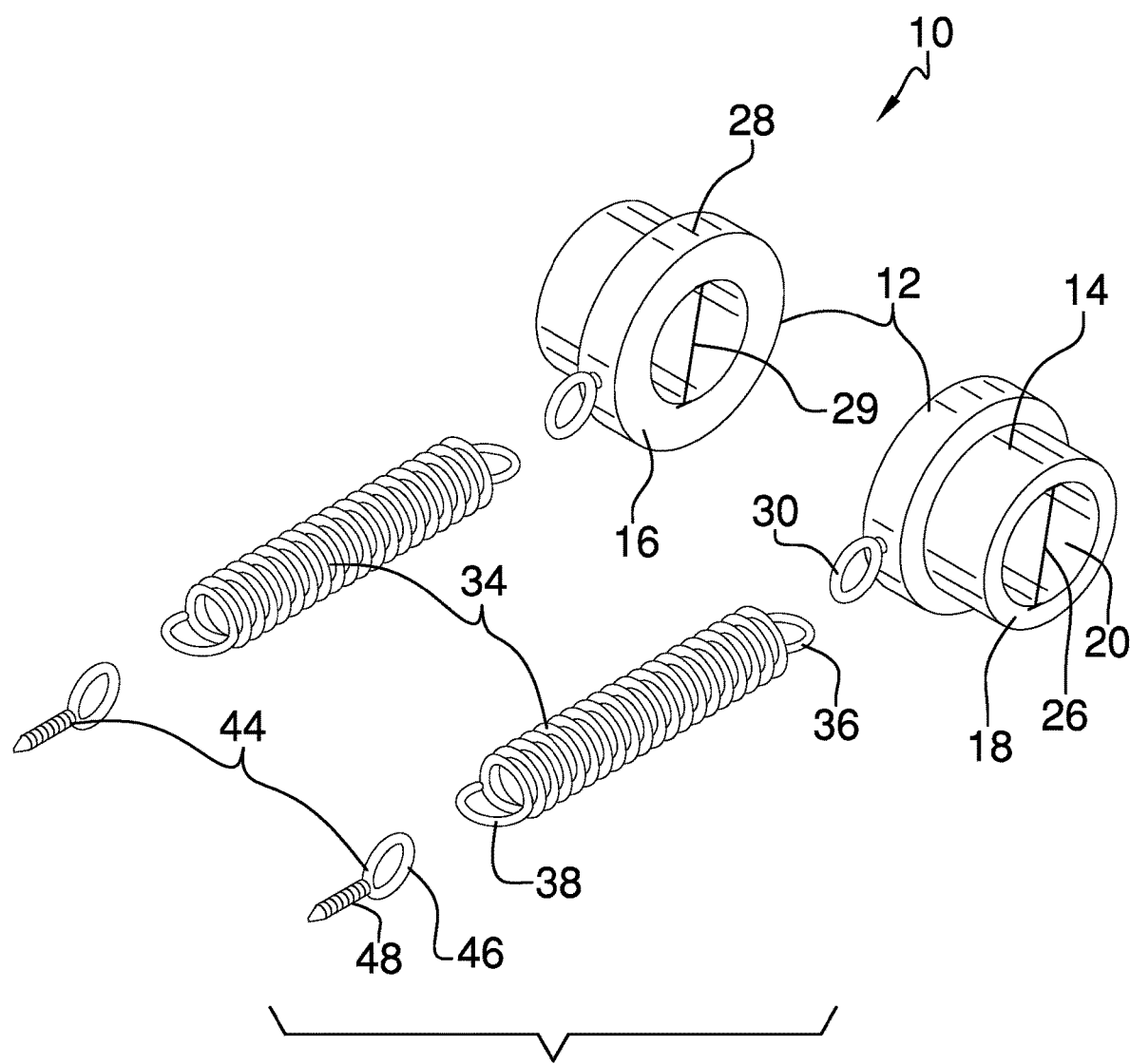
FIG. 1 is an isometric view of a faucet knob return spring kit according to an embodiment of the disclosure.
Figure 2:
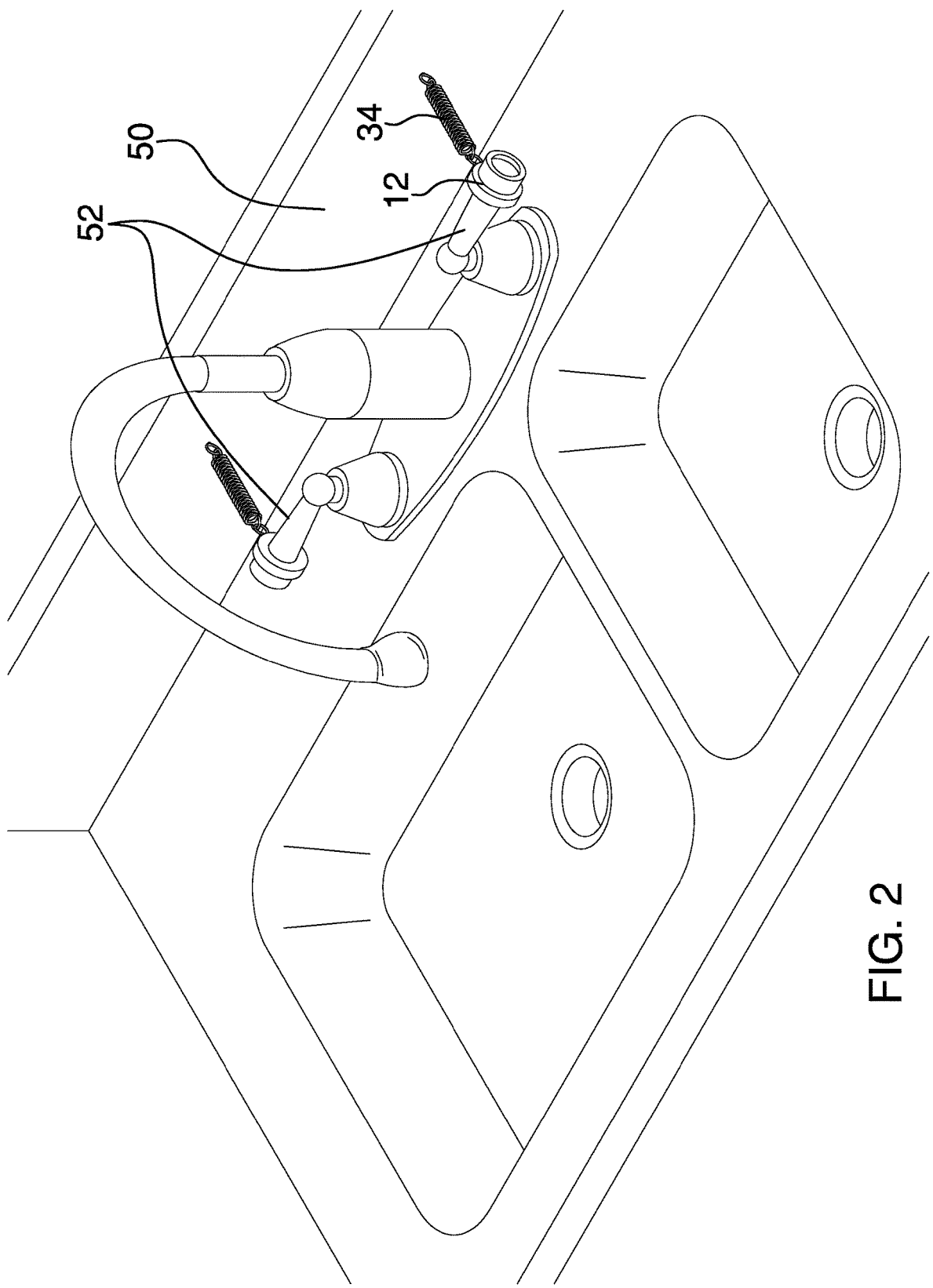
FIG. 2 is an isometric in-use view of an embodiment of the disclosure.
Figure 3:
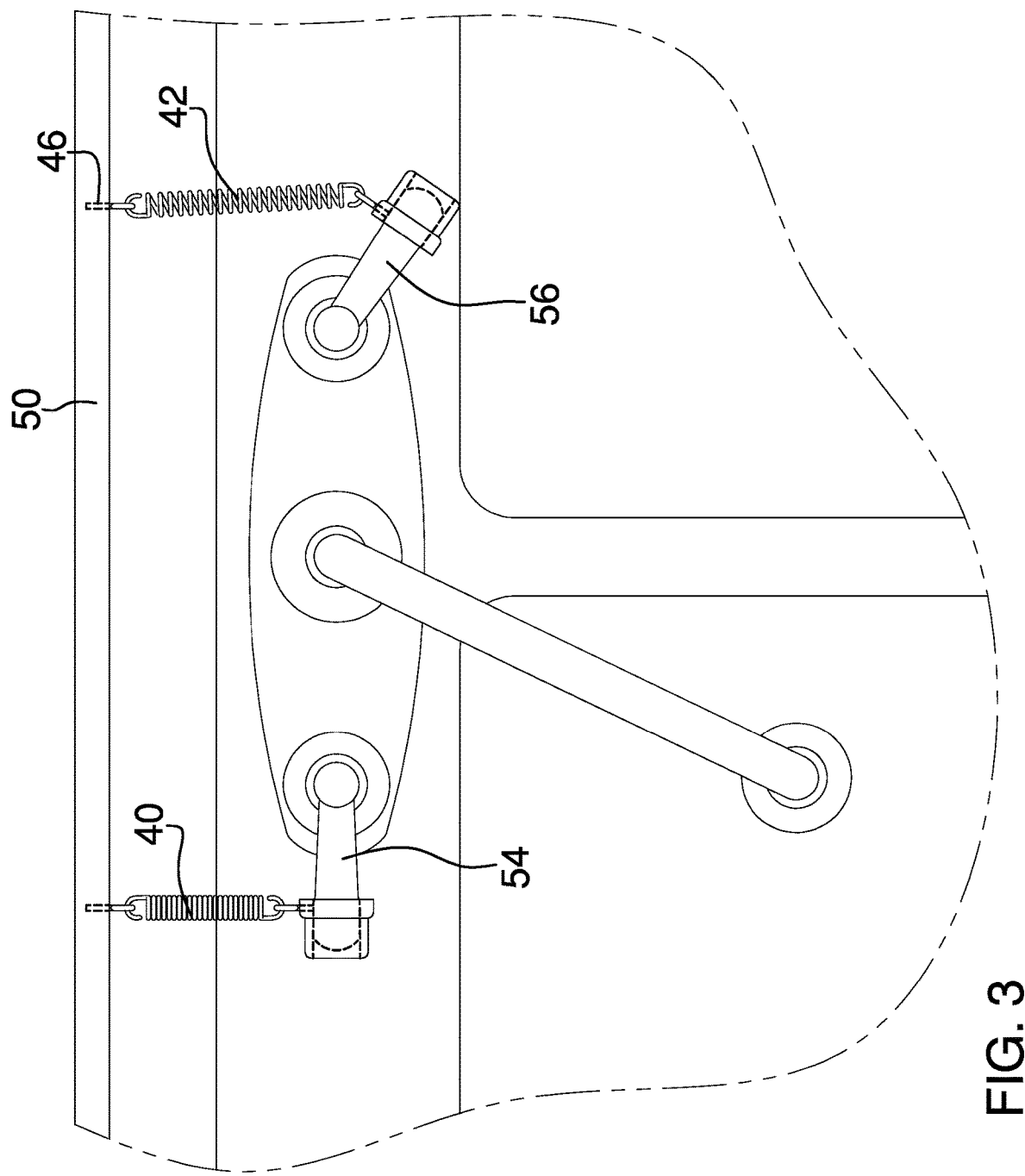
FIG. 3 is a top plan in-use view of an embodiment of the disclosure.
Figure 4:
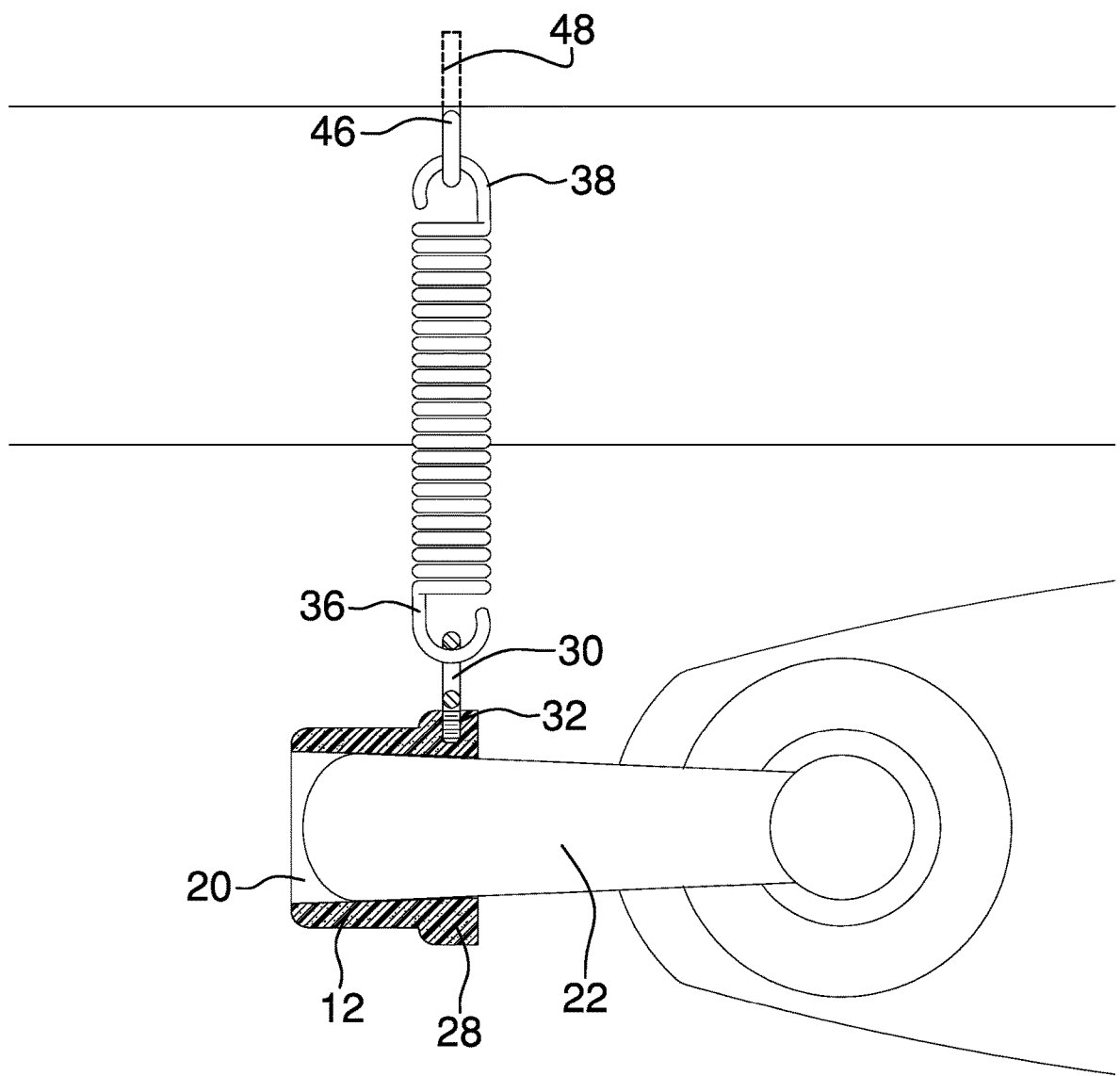
FIG. 4 is a cross-sectional view of an embodiment of the disclosure.

With reference now to the drawings, and in particular to FIGS. 1 through 4 thereof, a new faucet knob attachment embodying the principles and concepts of an embodiment of the disclosure and generally designated by the reference numeral 10 will be described.

As best illustrated in FIGS. 1 through 4, the faucet knob return spring kit 10 generally comprises a pair of knob sleeves 12 each having an outer perimeter 14, an inner end 16, an outer end 18, and a through hole 20 extending from the inner end 16 to the outer end 18. The through hole 20 is configured to receive and secure a faucet knob 22 and may be tapered for a more secure fit. The through hole extends through the inner end 16 at a first diameter 24 and extends through the outer end 18 at a second diameter 26. The second diameter 26 is greater than the first diameter 24. The outer perimeter 14 adjacent the inner end 16 may have a shoulder 28 to provide more material between the outer perimeter 14 and the through hole 20 to mount a pair of sleeve eyelets 30. Each of the pair of sleeve eyelets 30 may have a threaded extension 32 that couples within the shoulder 28 of the outer perimeter of the pair of knob sleeves. The threaded extension 32 may also provide a user with the ability to adjust the distance of the sleeve eyelet 30 from the knob sleeve 12.

A pair of extension springs 34 is coupled to the pair of sleeve eyelets 30. Each of the pair of extension springs 34 has a sleeve hook end 36 and a wall hook end 38 with the sleeve hook end 36 coupled to the pair of sleeve eyelets 30. Each of the pair of extension springs 34 has a rest position 40 and an alternate stretched position 42. A pair of eyelet screws 44 is coupled to the pair of extension springs 34. Each of the pair of eyelet screws 44 has a spring eyelet 46 and a threaded screw 48 with the spring eyelet 46 coupled to the wall hook end 38 of the pair of extension springs. The threaded screw 48 is configured to mount into a wall 50 adjacent the faucet knob.

In use, the pair of knob sleeves 12 is fitted onto a pair of faucet knobs 52. The pair of eyelet screws 44 is mounted into the wall 50 adjacent the pair of faucet knobs 22. The pair of extension springs 34 is coupled between spring eyelet 46 of the pair of eyelet screws and the pair of sleeve eyelets 30 such that each of the pair of extension springs 34 is in the rest position 40 when the pair of faucet knobs 52 is in an off position 54. The user then may rotate the pair of faucet knobs 52 into an on position 56, extending the pair of extension springs 34 to the alternate stretched position 42. When done, the user may merely release the pair of faucet knobs 52 and the pair of extension springs 34 will return to the rest position 40, moving the pair of faucet knobs 52 back to the off position 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A faucet knob return spring kit comprising:
   a pair of knob sleeves, each of the pair of knob sleeves having an outer perimeter and a through hole, the through hole being configured to receive and secure a faucet knob;
   a pair of sleeve eyelets coupled to the pair of knob sleeves, the pair of sleeve eyelets being coupled to the outer perimeter of the pair of knob sleeves;
   a pair of extension springs coupled to the pair of sleeve eyelets, each of the pair of extension springs having a sleeve hook end and a wall hook end, the sleeve hook end being coupled to the pair of sleeve eyelets, each of the pair of extension springs having a rest position and an alternate stretched position; and
   a pair of eyelet screws coupled to the pair of extension springs, each of the pair of eyelet screws having a spring eyelet and a threaded screw, the spring eyelet being coupled to the wall hook end of the pair of extension springs, the threaded screw being configured to mount into a wall adjacent the faucet knob.

2. The faucet knob return spring kit of claim 1 further comprising each of the pair of knob sleeves having an inner end and an outer end, the outer perimeter adjacent the inner end having a shoulder.

3. The faucet knob return spring kit of claim 2 further comprising each of the pair of sleeve eyelets having a threaded extension, the threaded extension being coupled within the shoulder.

4. The faucet knob return spring kit of claim 2 further comprising the through hole of each of the pair of knob sleeves being tapered, the through hole extending through the inner end at a first diameter and extending through the outer end at a second diameter, the second diameter being greater than the first diameter.

5. A faucet knob return spring kit comprising:
   a pair of knob sleeves, each of the pair of knob sleeves having an outer perimeter, an inner end, an outer end, and a through hole extending from the inner end to the outer end, the through hole of each of the pair of knob sleeves being tapered, the through hole extending through the inner end at a first diameter and extending through the outer end at a second diameter, the second diameter being greater than the first diameter, the outer perimeter adjacent the inner end having a shoulder, the through hole being configured to receive and secure a faucet knob;
   a pair of sleeve eyelets coupled to the pair of knob sleeves, each of the pair of sleeve eyelets having a threaded extension, the threaded extension being coupled to the shoulder of the outer perimeter of the pair of knob sleeves;
   a pair of extension springs coupled to the pair of sleeve eyelets, each of the pair of extension springs having a sleeve hook end and a wall hook end, the sleeve hook end being coupled to the pair of sleeve eyelets, each of the pair of extension springs having a rest position and an alternate stretched position; and
   a pair of eyelet screws coupled to the pair of extension springs, each of the pair of eyelet screws having a spring eyelet and a threaded screw, the spring eyelet being coupled to the wall hook end of the pair of extension springs, the threaded screw being configured to mount into a wall adjacent the faucet knob.

* * * * *